(12) United States Patent  
Onishi et al.

(10) Patent No.: US 8,428,950 B2
(45) Date of Patent: Apr. 23, 2013

(54) RECOGNIZER WEIGHT LEARNING APPARATUS, SPEECH RECOGNITION APPARATUS, AND SYSTEM

(75) Inventors: Yoshifumi Onishi, Tokyo (JP); Tadashi Emori, Tokyo (JP)

(73) Assignee: NEC Corporation, Tokyo (JP)

( * ) Notice: Subject to any disclaimer, the term of this patent is extended or adjusted under 35 U.S.C. 154(b) by 908 days.

(21) Appl. No.: 12/525,930

(22) PCT Filed: Jan. 18, 2008

(86) PCT No.: PCT/JP2008/050586
§ 371 (c)(1),
(2), (4) Date: Aug. 5, 2009

(87) PCT Pub. No.: WO2008/096582
PCT Pub. Date: Aug. 14, 2008

(65) Prior Publication Data
US 2010/0318358 A1 Dec. 16, 2010

(30) Foreign Application Priority Data
Feb. 6, 2007 (JP) .................................. 2007-026786

(51) Int. Cl.
*G10L 15/04* (2006.01)
(52) U.S. Cl.
USPC ........... 704/254; 704/242; 704/231; 704/251; 704/256; 704/247
(58) Field of Classification Search ................... 704/242, 704/251, 255, 256.1, 256, 247, 240, 231, 704/9, 232, 254
See application file for complete search history.

(56) References Cited

U.S. PATENT DOCUMENTS
5,625,748 A * 4/1997 McDonough et al. ........ 704/251
5,687,287 A * 11/1997 Gandhi et al. ................ 704/247
(Continued)

FOREIGN PATENT DOCUMENTS
JP 60-100197 A 6/1985
JP 63-068899 A 3/1988
(Continued)

OTHER PUBLICATIONS
International Search Report for PCT/JP2008/050586 mailed May 1, 2008.
(Continued)

*Primary Examiner* — Vijay B Chawan

(57) ABSTRACT

A speech recognition apparatus (110) selects an optimum recognition result from recognition results output from a set of speech recognizers (s1-sM) based on a majority decision. This decision is implemented with taking into account weight values, as to the set of the speech recognizers, learned by a learning apparatus (100). The learning apparatus includes a unit (103) selecting speech recognizers corresponding to characteristics of speech for learning (101), a unit (104) finding recognition results of the speech for learning by using the selected speech recognizers, a unit (105) unifying the recognition results and generating a word string network, and a unit (106) finding weight values concerning a set of the speech recognizers by implementing learning processing. When finding weight values, the learning apparatus selects a word from each arc set in the word string network based on a majority decision which is taken into account candidates of weight value, and outputs weight value candidates which minimize a recognition error rate of a word string formed of the selected words, as a learning result.

17 Claims, 8 Drawing Sheets

U.S. PATENT DOCUMENTS

| | | | |
|---|---|---|---|
| 5,794,190 A * | 8/1998 | Linggard et al. | 704/232 |
| 5,806,029 A * | 9/1998 | Buhrke et al. | 704/244 |
| 6,397,179 B2 * | 5/2002 | Crespo et al. | 704/242 |
| 6,493,667 B1 * | 12/2002 | de Souza et al. | 704/240 |
| 6,615,178 B1 * | 9/2003 | Tajima | 704/277 |
| 6,898,567 B2 * | 5/2005 | Balasuriya | 704/231 |
| 7,054,810 B2 * | 5/2006 | Gao et al. | 704/231 |
| 7,624,006 B2 * | 11/2009 | Chelba et al. | 704/9 |
| 7,684,988 B2 * | 3/2010 | Barquilla | 704/256.1 |
| 8,296,144 B2 * | 10/2012 | Weng et al. | 704/270 |
| 2002/0152069 A1 * | 10/2002 | Gao et al. | 704/240 |
| 2005/0021337 A1 * | 1/2005 | Kwon | 704/256 |
| 2006/0069560 A1 * | 3/2006 | Passaretti et al. | 704/251 |
| 2007/0185713 A1 * | 8/2007 | Jeong et al. | 704/254 |

FOREIGN PATENT DOCUMENTS

| | | |
|---|---|---|
| JP | 6-067698 A | 3/1994 |
| JP | 6-110500 A | 4/1994 |
| JP | 6-309464 A | 11/1994 |
| JP | 8-202388 A | 8/1996 |
| JP | 8-286695 A | 11/1996 |
| JP | 9-190420 A | 7/1997 |
| JP | 2005309920 A | 11/2005 |

OTHER PUBLICATIONS

J. G. Fiscus. "A Post-Processing System to Yield Reduced Word Error Rates: Recognizer Output Voting Error Reduction (ROVER)," Proc. IEEE ASRU Workshop, 1997, pp. 352-437.

S. Young et al., "The HTK Book (for HTK Version 3.3)" Chapter 3, Cambridge University (http://htk.eng.cam.ac.uk/), 2005, pp. 22-24.

N. Morgan et al., "Speech Recognition Using On-Line Estimation of Speaking Rate," Proc. Euro Speech, 1997.

N. Minematsu et al., "Automatic estimation of one's age with his/her speech based upon acoustic modeling techniques of speakers," Proc. ICASSP 2002, pp. I-137-I140.

ETSI ES 202 050 V1.1.1, "Speech processing, Transmission and Quality aspects (STQ); Distributed speech recognition; Advanced front-end feature extraction algorithm; Compression algorithm", 2002.

Frank Wessel et al., "Confidence Measures for Large Vocabulary Continuous Speech Recognition." IEEE Trans. on Speech and Audio Processing, vol. 9, No. 3, Mar. 2001.

* cited by examiner

| SPEAKING RATE | AGE | SNR |
|---|---|---|
| SLOW | CHILD | LARGE |
| MEDIUM | YOUNG OR MIDDLE-AGED | MEDIUM |
| FAST | AGED | SMALL |

FIG. 3

RECOGNIZER WEIGHT LEARNING APPARATUS, SPEECH RECOGNITION APPARATUS, AND SYSTEM

This application is the National Phase of PCT/JP2008/050586, filed Jan. 18, 2008, which is based upon and claims priority from Japanese Patent Application No. 2007-026786 filed Feb. 6, 2007.

TECHNICAL FIELD

The present invention relates to a speech recognition technique, in particular to a speech recognition technique using a technique for determining a final recognition result based on a recognition result obtained from a plurality of speech recognizers.

BACKGROUND ART

An example of a speech recognition system is described in Non Patent Literature 1. FIG. 7 shows a configuration of the speech recognition system described in Non Patent Literature 1. A system 300 includes speech input unit 301, speech recognition unit 302, recognition result unification unit 303, recognition result selection unit 304, and recognition result output unit 305. The system 300 operates as described below.

When speech to be recognized is input from the speech input unit 301, the speech recognition unit 302 implements recognition processing on the speech, and outputs a result of the recognition. The speech recognition unit 302 includes N speech recognizers for implementing speech recognition processing, and outputs N word strings of the recognition result. The recognition result unification unit 303 unites N recognition result word strings and generates one word string network.

When generating the word string network, the recognition result unification unit 303 first arranges N recognition result word strings so as to match them with each other as much as possible. With respect to each recognition result word string, a node is set every word punctuation, and each word is recognized as an arc. The word string network is a network in which the recognition result word strings thus aligned branch off or join.

The recognition result selection unit 304 selects an optimum word string path included in the word string network. The recognition result output unit 305 outputs the selected path as a final recognition result.

Operation of the system 300 will now be described with reference to FIG. 8 by taking the case where the number of speech recognizers included in the speech recognition unit 302 is three as an example. The speech recognition unit 302 outputs recognition result word strings of three systems (recognition results #1 to #3) for the input speech by using the three speech recognizers as shown in FIG. 8(A). In FIG. 8, each of a, b, c, . . . represents a word. The recognition result unification unit 303 generates a word string network from the recognition result word strings of the three systems according to a procedure described in section 2.1 in Non Patent Literature 1.

The recognition result unification unit 303 arranges recognition result 1 and recognition result 2 so as to match with each other by implementing DP matching on them, and recognizes each word as an arc. As a result, a word string network based on the recognition result 1 and recognition result 2 is generated as shown in FIG. 8(B-1). "φ" represents an empty word. In the illustrated example, the word "b" and the word "d" coincide between the recognition result 1 and the recognition result 2. Therefore, the recognition result 1 and the recognition result 2 are arranged so as to cause the word "b" and the word "d" to match with each other.

In addition, DP matching of a recognition result 3 is implemented on the word string network based on the recognition result 1 and the recognition result 2. As a result, the word string network is expanded as shown in FIG. 8(B-2). Even if the number of speech recognizers is at least three, therefore, the word string network can be expanded successively in the same way by repeating the above-described procedure.

The recognition result selection unit 304 selects an optimum word string path from the word string network obtained as described above by implementing majority decision in a set of word arcs sandwiched between nodes. As a result, a final recognition result as shown in FIG. 8(C) is output from the recognition result output unit 305. In selecting an optimum word string, an ith optimum word wi is determined according to following [Math. 1], where S(w,i) is the number of times a word w appears in a set of ith word candidate arcs. An optimum word string path is selected by determining wi successively for i=1, 2, . . .

$$w_i = \mathrm{argmax}_w S(w, i) \qquad [\text{Math. 1}]$$

{Citation List}
{Non Patent Literature}
{NPL 1}: Jonathan G. Fiscus, "A Post-Processing System to Yield Reduced Word Error Rates: Recognizer Output Voting Error Reduction (ROVER)," Proc. IEEE ASRU Workshop, 1997, pp. 352-437
{NPL 2}: Steve Young et al., "The HTK Book (for HTK Version 3.3)" Chapter 3, Cambridge University (http://htk.eng.cam.ac.uk/), 2005, pp. 22-25
{NPL 3}: Nelson Morgan et al., "Speech Recognition Using On-Line Estimation of Speaking Rate," Proc. Euro Speech, 1997
{NPL 4}: N. Minematsu, M. Sekiguchi, and K. Hirose, "Automatic estimation of one's age with his/her speech based upon acoustic modeling techniques of speakers," Proc. ICASSP 2002, p. I-137-140
{NPL 5}: ETSI ES 202 050 V1.1.1, "Speech processing, Transmission and Quality aspects (STQ); Distributed speech recognition; Advanced front-end feature extraction algorithm; Compression algorithm," 2002
{NPL 6}: Frank Wessel et al., "Confidence Measures for Large Vocabulary Continuous Speech Recognition," IEEE Trans. on Speech and Audio Processing, Vol. 9, No. 3, March 2001

SUMMARY OF INVENTION

Technical Problem

However, the above-described technique has the following problems.

A first problem is that there is a possibility that a majority decision for selecting an optimum word string from a word string network will not function effectively. The reason is as follows: for example, if a plurality of speech recognizers cause a common recognition error, an erroneous recognition result is selected as an optimum word string by a majority decision. When a large number of speech recognizers which frequently generate recognition errors are included in the speech recognition unit 302, a word string which becomes a correct answer becomes relatively fewer hypotheses even if respective errors are not the same error. As a result, the correct answer becomes hard to be selected.

A second problem is that it is difficult to reduce the quantity of calculation when generating the word string network as shown in FIG. 8. The reason is that all speech recognizers included in the system are used to obtain word strings which become components of the word string network.

On the other hand, if, for example, the number of existing speech recognizers is reduced in order to avoid the first and second problems, it becomes hard to cope with various speech inputs. As a result, there is a possibility that the performance improving effect will be reduced. Because in this case the number of recognition results output from the speech recognizers is reduced and consequently choices of the optimum word string are limited.

An object of the present invention is to provide a technique for deriving a proper recognition result efficiently in speech recognition processing.

Solution to Problem

A recognizer weight learning apparatus according to the present invention is a recognizer weight learning apparatus connected to a storage device retaining a plurality of speech recognizers which differ in speech characteristics to be recognized, including: a selection unit selecting speech recognizers corresponding to characteristics of speech for learning from the storage device; a recognition unit finding recognition results of the speech for learning by using a set of the selected speech recognizers; an unification unit unifying the recognition results obtained by using the set of the selected speech recognizers and generating a word string network; and a learning unit finding weight values concerning the set of the speech recognizers by implementing learning processing, wherein the learning unit selects a word from each arc set in the word string network based on a majority decision which is taken into account candidates of weight value, and outputs candidates of weight value which minimize a recognition error rate of a word string formed of the selected words, as a learning result.

A speech recognition apparatus according to the present invention is a speech recognition apparatus connected to storage devices for storing speech recognizers used by the recognizer weight learning apparatus and weight values output from the recognizer weight learning apparatus, the speech recognition apparatus including: a selection unit selecting speech recognizers corresponding to characteristics of input speech from the storage devices; a recognition unit finding recognition results of the input speech by using a set of the selected speech recognizers; an unification unit unifying the recognition results obtained by using the set of the speech recognizers and generating a word string network; and a result selection unit selecting a word string of an optimum recognition result from the word string network and outputting the word string, wherein the result selection unit acquires weight values corresponding to the set of the speech recognizers from the storage devices, selects a word from each arc set in the word string network by implementing a majority decision which is taken into account the acquired weight values, and outputs a word string formed of selected words as the optimum recognition result.

A system according to the present invention includes the recognizer weight learning apparatus, storage devices for storing speech recognizers used by the recognizer weight learning apparatus and weight values output from the recognizer weight learning apparatus, and the speech recognition apparatus.

Advantageous Effects of Invention

According to the present invention, when finding weight values to be associated with speech recognizers, the recognizer weight learning apparatus can learn so as to provide speech recognizers containing more recognition errors with smaller weight values and provide speech recognizers containing more correct answers with larger weight values. The speech recognition apparatus finds the optimum recognition result by using the weight values thus learned. As a result, the speech recognition apparatus can obtain a proper optimum recognition result with performance of the speech recognizers taken into consideration. In addition, since the speech recognition apparatus selectively uses speech recognizers in the storage device, it is easy to reduce the calculation quantity of recognition processing and the processing can be made efficient.

BRIEF DESCRIPTION OF DRAWINGS

FIG. 3 An explanation diagram concerns classification of speech recognizers according to an embodiment of the present invention;

REFERENCE SIGNS LIST

Figure 1:
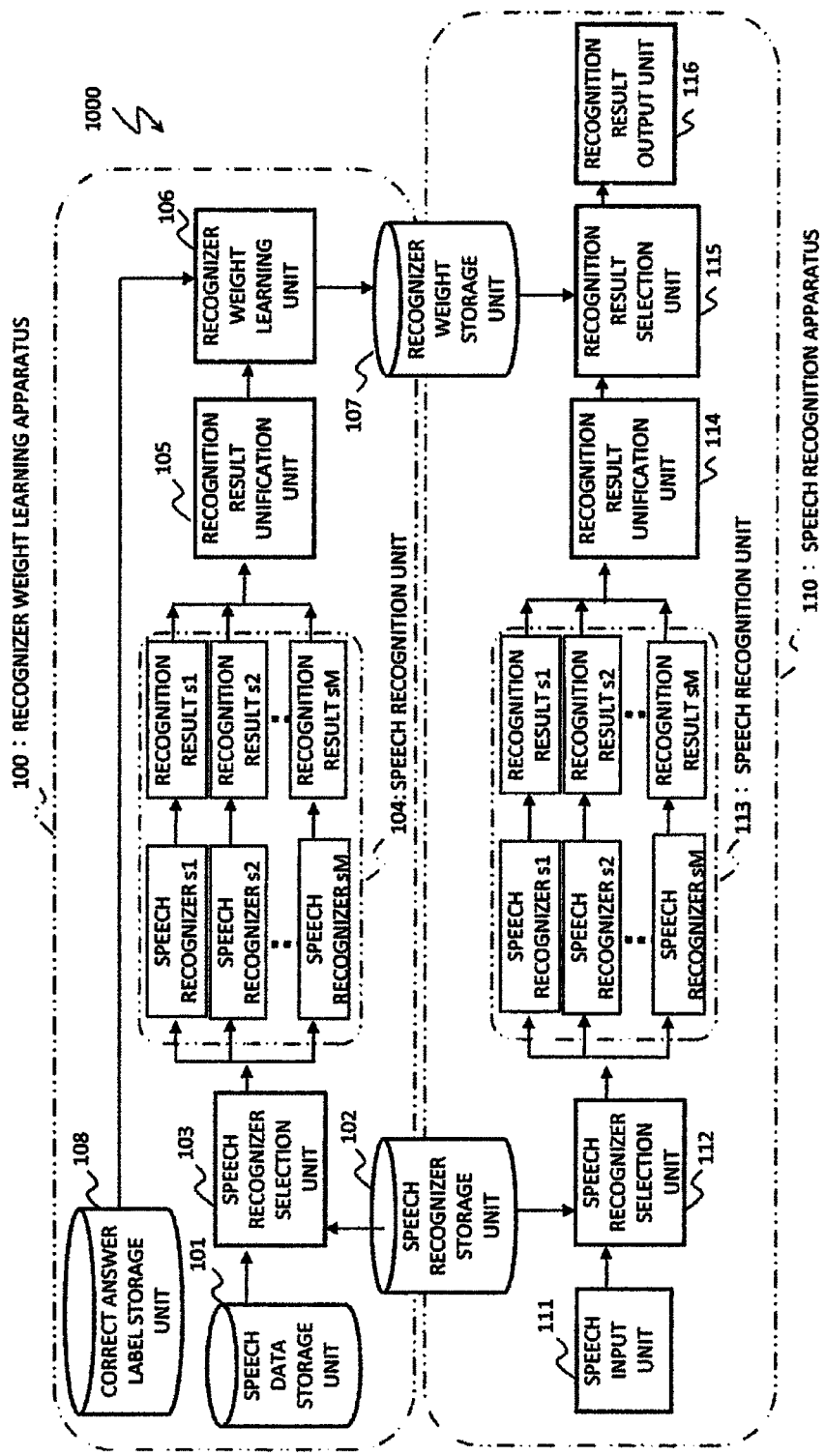
FIG. 1 A block diagram shows a system configuration according to an embodiment of the present invention.

1000 System
100 Recognizer weight learning apparatus
101 Speech data storage unit
102 Speech recognizer storage unit
103 Speech recognizer selection unit
104 Speech recognition unit
105 Recognition result unification unit
106 Recognizer weight learning unit
107 Recognizer weight storage unit
108 Correct answer label storage unit
110 Speech recognition apparatus
111 Speech input unit
112 Speech recognizer selection unit
113 Speech recognition unit
114 Recognition result unification unit
115 Recognition result selection unit
116 Recognition result output unit

[Description of Embodiments]

FIG. 1 shows a system configuration according to an embodiment of the present invention. A system 1000 according to the embodiment includes a recognizer weight learning apparatus 100 and a speech recognition apparatus 110 each of which is implemented by using an information processing apparatus such as a personal computer, and a speech recognizer storage unit 102 and a recognizer weight storage unit 107 such as hard disk devices or memories which can be accessed by these both apparatuses. The speech recognizer storage unit 102 and the recognizer weight storage unit 107 may also be incorporated in one of the apparatuses (100, 110) as long as they can be accessed by both apparatuses (100, 110).

As shown in FIG. 1, the recognizer weight learning apparatus 100 includes a speech data storage unit 101, speech recognizer selection unit 103, speech recognition unit 104, recognition result unification unit 105, recognizer weight learning unit 106, and a correct answer label storage unit 108. Each of the speech data storage unit 101 and the correct answer label storage unit 108 is a storage device such as a hard disk device or a memory. Other components are computer programs.

A large amount of speech data to be used to learn recognizer weight values are stored in the speech data storage unit 101. A program serving as a speech recognizer is stored for each classification of the learning model described later, in the speech recognizer storage unit 102. In the same way as the conventional speech recognizer, the speech recognizer implements recognition processing on input speech data. A correct answer label corresponding to speech data in the speech data storage unit 101 is stored in the correct answer label storage unit 108.

Operation of the recognizes weight learning apparatus 100 shown in FIG. 1 will now be described with reference to the flow chart shown in FIG. 2. The speech recognizer selection unit 103 selects speech recognizers suitable for speech data X for learning, which is input from the speech data storage unit 101, out of the speech recognizer storage unit 102. At this time, the speech recognizer selection unit 103 selects M (where N>M) speech recognizers s1(X), s2(X), sM(X) corresponding to characteristics of the speech data X out of N speech recognizers stored in the speech recognizer storage unit 102 (step S1).

FIG. 3 shows classification of speech recognizers stored in the speech recognizer storage unit 102 according to the present embodiment. As shown in FIG. 3, three categories, "speaking rate" representing a speaking speed, "age" of a speaker, and "SNR" standing for signal to noise ratio are prepared for speech recognizers according to the present embodiment. Furthermore, three classes representing the degree are provided in each category. Therefore, there are speech recognizers of nine kinds (N=9) in the speech recognizer storage unit 102.

Classification of the speech recognizers is implemented as described hereafter. For example, in the case of the category of "speaking rate," the speaking rate is calculated from each of learning data of acoustic models used for speech recognizers and the calculated speaking rate is distributed among "slow," "fast" and "medium." Ratios of the distribution can be made, for example, equal to each other. Or in order to secure the learning data quantity of each class, it is also possible to permit data overlapping, and set the ratios of "slow" and "fast" equal to 50% and set the ratio of "medium" equal to 50% obtained as the remainder obtained by setting the ratios of "slow" and "fast" equal to 25%. Three models concerning "speaking rate" are learned by learning acoustic models of respective classes by the use of data classified into classes.

Acoustic models are learned for respective classes with respect to "age" and "SNR" as well in the same way. As a result, a total of nine acoustic models are learned. The speech recognizers stored in the speech recognizer storage unit 102 use the leaned acoustic models. As for acoustic models of speech recognizers and their learning methods, arbitrary ones can be applied. For example, if the widely used hidden Markov model (HMM) is used, it is possible to follow a method described in Chapter 3 in Non Patent Literature 2 and use tools distributed there.

The speech recognizer selection unit 103 according to the embodiment selects speech recognizers corresponding to the characteristics of the speech data X out of nine (N=9) speech recognizers in the speech recognizer storage unit 102. The speech recognizer selection unit 103 selects one speech recognizer for each of the categories "speaking rate," "age" and "SNR," i.e., a total of three (M=3) speech recognizer. At the time of selection, the speech recognizer selection unit 103 presumes characteristics of the speech data X for each category according to a method described later, and makes a decision which class the presumed value comes under. Then the speech recognizer selection unit 103 selects speech recognizers of the classes obtained by the decision as optimum speech recognizers for the speech data. For example, if the presumed value obtained as regards "speaking rate" comes under "slow," a speech recognizer in the "slow" class is selected as an optimum speech recognizer from the "speaking rate" category.

For presuming the "speaking rate," for example, a method for presuming the speaking rate in a signal processing way described in Non Patent Literature 3 can be used. For presuming the "age," for example, a method using a GMM (Gaussian Mixture Model) described in Non Patent Literature 4 can be used. For presuming the "SNR," for example, a method for presuming a speech section and a non-speech section from input speech by using a signal processing technique and presuming the SNR from their spectrum ratio described in Non Patent Literature 5 can be used. Speech recognition processing can be implemented at a comparatively high rate and a less calculation quantity by using the methods described in Non Patent Literature 3 to Non Patent Literature 5.

By the way, the method using the GMM described in Non Patent Literature 4 can be used not only to presume the "age" but also to presume other characteristics by using "speaking rate" or "SNR" instead of "age" as a label. In addition, also in the case where characteristics are other than "speaking rate," "age" and "SNR," it is possible to utilize a method for classifying data from which acoustic models are to be learned into classes and using the GMM based on the characteristics.

Figure 2:
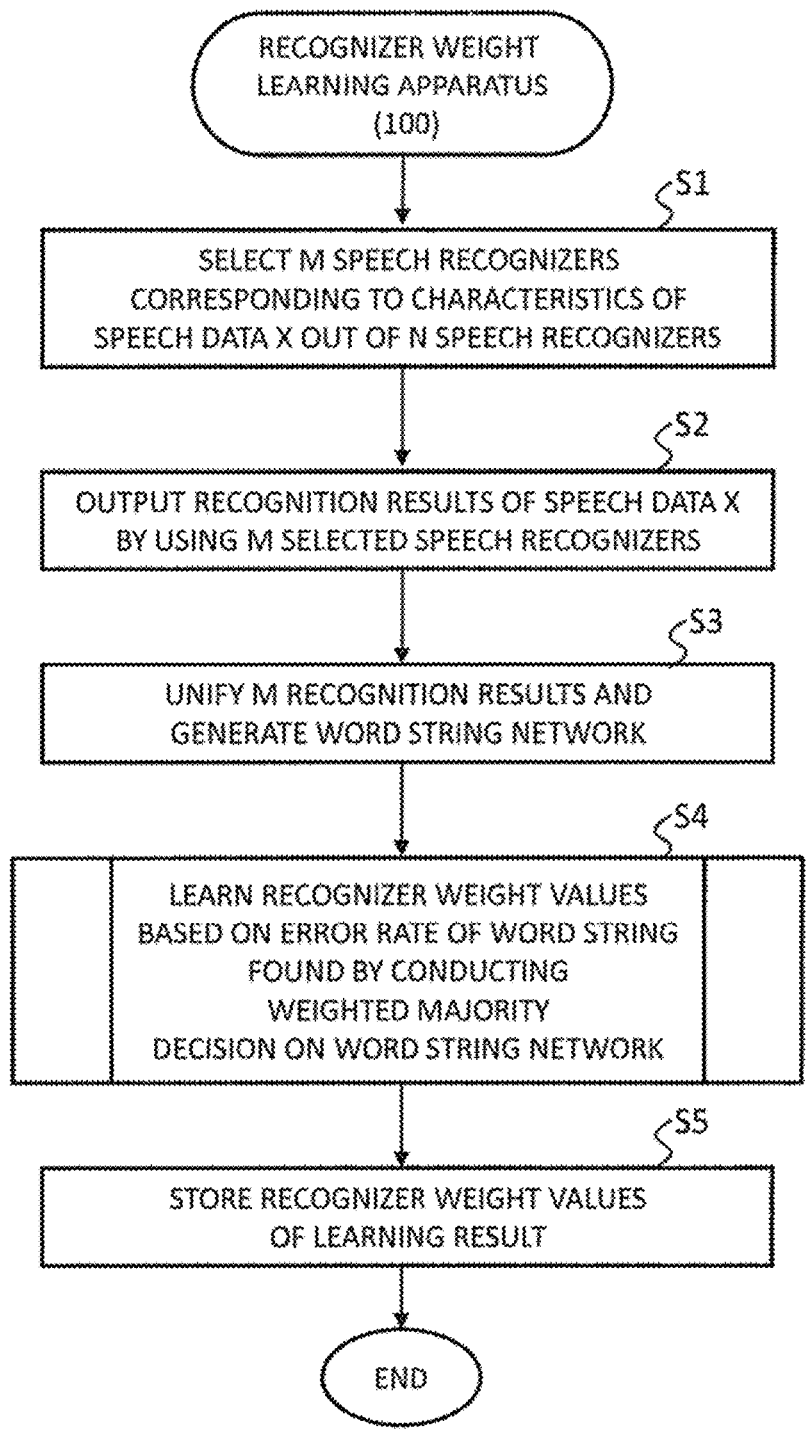
FIG. 2 A flow chart concerns basic operation of a recognizer weight learning apparatus according to an embodiment of the present invention.

The speech recognition unit 104 implements speech recognition processing on input speech data by using M speech recognizers selected by the speech recognizer selection unit 103, and outputs M recognition results s1, s2, ..., sM (step S2 in FIG. 2).

Figure 8:
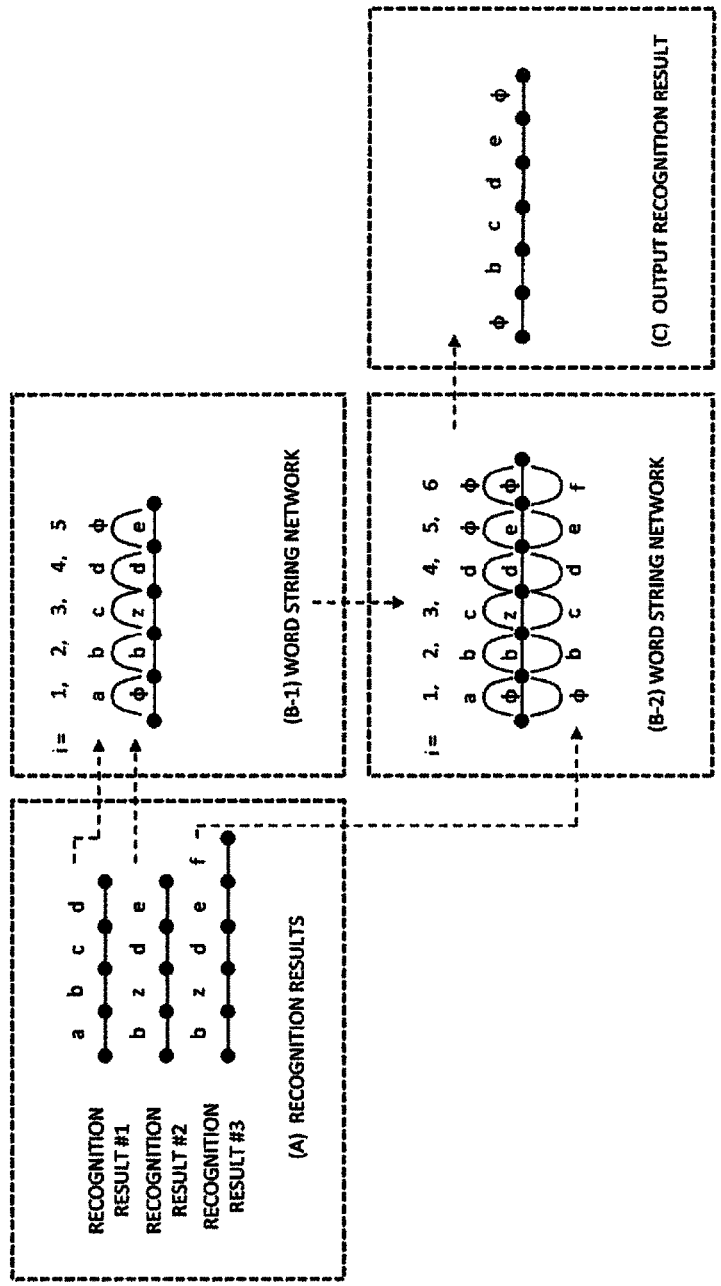
FIG. 8 An explanation diagram concerning a recognition result which is output by a speech recognition apparatus described in Non Patent Literature 1.

The recognition result unification unit 105 unifies M recognition results which are output from the speech recognition unit 104 by using a method described in Section 2.1 in Non Patent Literature 1, and thereby generates a word string network as shown in (B-2) in FIG. 8 (step S3).

The recognizer weight learning unit 106 compares a correct answer level corresponding to the speech data X in the correct answer level storage unit 108 with a word string obtained by implementing a weighted majority decision on the word string network, thereby finds an error rate of this word string, and learns the recognizer weight values by using the error rate thus found (step S4). Then the recognizer weight learning unit 106 stores the recognizer weight values obtained as a result of learning into the recognizer weight storage unit 107 (step S5).

Figure 4:
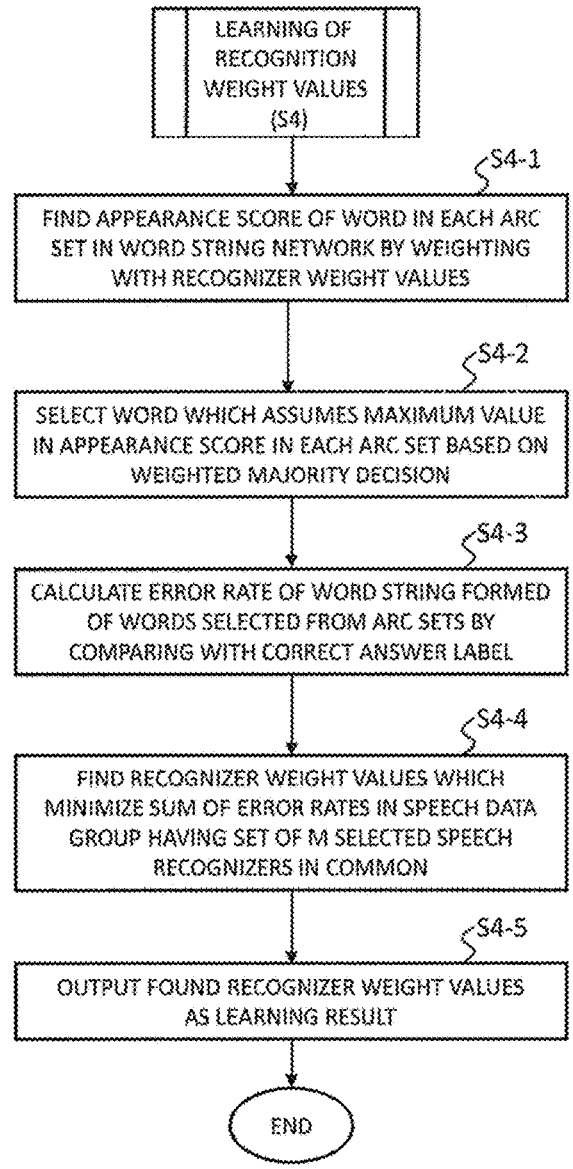
FIG. 4 A flow chart concerns detailed operation of a recognizer weight learning apparatus according to an embodiment of the present invention.

The processing implemented by the recognizer weight learning unit 106 will now be described in detail with reference to a flow chart shown in FIG. 4. The recognizer weight learning unit 106 implements processing described hereafter every speech data group with which a set of M speech recognizers selected by the speech recognizer selection unit 103 coincides.

M speech recognizers selected by the speech recognizer selection unit 103 for each speech data X are denoted by $s1(X), s2(X), \ldots, sM(x)$, and their set $\Omega X$ is represented by [Math. 2] described later. At this time, recognizer weight values $\Lambda(\Omega X)$ of M selected speech recognizers are represented as in [Math. 3]. In the learning processing, the recognizer weight values $\Lambda(\Omega X)$ are candidate values which assume a real number between "0" and "1" both inclusive. In other words, candidate values satisfying the condition described later among candidate values which change in the above described range in the learning processing become recognizer weight values of the final learning result.

$$\Omega_X = \{s1(X), s2(X), \ldots, sM(X)\} \qquad \text{[Math. 2]}$$

$$\Lambda(\Omega_X) = \{\lambda_{s1(X)}, \lambda_{s2(X)}, \ldots, \lambda_{sM(X)}\} \qquad \text{[Math. 3]}$$

The recognizer weight learning unit 106 finds a score $S(w, i, \Lambda(\Omega X))$ of appearance of a word w in an ith ($i=1, 2, \ldots$) arc set in the word string network by weighting with the recognizer weight values in [Math. 3], according to the following [Math. 4] (step S4-1). The ith arc set is a set of words identified by "$i=1, 2, \ldots$" described in FIGS. 8 (B-1) and (B-2).

$$S(w, i, \Lambda(\Omega_X)) = \sum_{j=1}^{M} \lambda_{sj(X)} \delta_{w_j,w}, \quad \delta_{a,b} = \begin{cases} 1 & \cdots a = b \\ 0 & \cdots a \neq b \end{cases} \qquad \text{[Math. 4]}$$

By the way, in the case where the speech recognizers output reliability together with the recognition result word string, the appearance score $S(w, i, \Lambda(\Omega X))$ of the word w may be found by weighting the reliability converted to a value between "0" and "1" both inclusive. The score in this case can be calculated by the following [Math. 5]. Here, $C(wj)$ in [Math. 5] is reliability of an ith word wj which is output by a speech recognizer j. The reliability calculation method is described in detail in, for example, Non Patent Literature 6.

$$S(w, i, \Lambda(\Omega_X)) = \sum_{j=1}^{M} \lambda_{sj(X)} C(w_j) \delta_{w_j,w} \qquad \text{[Math. 5]}$$

If the appearance score of each word w in the arc set is calculated as described above, a word wi which assumes a maximum value in appearance score is found every arc set based on a weighted majority decision $wi(\Lambda(\Omega X))$ represented by the following [Math. 6]. Words wi are thus determined successively from respective arc sets i ($i=1, 2, \ldots$) based on the majority decision depending upon the recognizer weight values (step S4-2).

$$w_i(\Lambda(\Omega_X)) = \operatorname*{argmax}_{w} S(w, i, \Lambda(\Omega_X)) \qquad \text{[Math. 6]}$$

Subsequently, the recognizer weight learning unit 106 reads out a correct answer label corresponding to speech data X from the correct answer label storage unit 108, compares the correct answer label read out with a word string formed of the words wi found from respective arc sets ($i=1, 2, \ldots$), and thereby calculates an error rate of the word string (step S4-3).

To be precise, the recognizer weight learning unit 106 implements DP matching between the word string of the correct answer label and the word string formed of the words wi and thereby associates the word strings with each other so as to match the words with each other as much as possible. Then the recognizer weight learning unit 106 calculates the number of coinciding words, the number of replacement error words, the number of insertion error words, and the number of omission error words, and calculates an error rate (err) according to the following [Math. 7] or [Math. 8] by using the obtained result. As described earlier, the word string of words wi determined by [Math. 6] depends upon the recognizer weight values, i.e., changes according to candidates of the recognizer weight values. Therefore, the error rate (err) obtained according to [Math. 7] or [Math. 8] based on [Math. 6] also becomes a quantity depending upon the recognizer weight values.

$$err = \frac{(\text{The number of replacement error words}) + (\text{the number of omission error words})}{\left(\begin{array}{c}\text{The number of correct}\\ \text{answer label words}\end{array}\right)} \qquad \text{[Math. 7]}$$

$$err = \frac{(\text{The number of replacement error words}) + (\text{the number of omission error words}) - (\text{the number of insertion error words})}{\left(\begin{array}{c}\text{The number of correct}\\ \text{answer label words}\end{array}\right)} \qquad \text{[Math. 8]}$$

The recognizer weight learning unit 106 finds recognizes weight values $\Lambda\Omega$ which minimize the sum of those error rates according to [Math. 9] in a speech data group in which a set of M selected speech recognizers coincides (step S4-4). As a result, a learning result of recognizer weight values to be stored in the recognizer weight storage unit 107 is obtained (step S4-5). This learning result is weight values concerning a set of M speech recognizers selected this time, and it is used when the speech recognition apparatus 110 described later implements speech recognition using the same set.

$$\Lambda^\Omega = \operatorname*{argmin}_{\Lambda} \sum_{X:\Omega_X = \Omega} err(\Lambda(\Omega_X)) \qquad \text{[Math. 9]}$$

As described earlier, the error rate (err) changes according to candidates of the recognizer weight values which assume a real number between "0" and "1" both inclusive. Therefore, the recognizer weight values $\Lambda\Omega$ of the learning result is found by detecting a candidate value obtained when the sum of error rates becomes minimum in the learning processing which successively shifts the candidate value. By the way, if speech data from which M speech recognizers are selected is only one, i.e., if besides the speech data, speech data for which M set elements coincide does not exist, then recognizer weight values which minimize the error rate of the speech data of its single substance are found.

As heretofore described, the recognizer weight learning apparatus 100 according to the present embodiment determines the recognizer weight values so as to minimize the error rate of M speech recognizers corresponding to the recognizer weight values of the learning object. As a speech recognizer contains more recognition errors, therefore, the weight value can be set to be smaller. As a speech recognizer contains more correct answers, the weight value can be set to be larger.

The speech recognition apparatus 110 according to the present embodiment will now be described. As shown in FIG. 1, the speech recognition apparatus 110 includes speech input unit 111, speech recognizer selection unit 112, speech recognition unit 113, recognition result unification unit 114, recognition result selection unit 115, and recognition result output unit 116. All of these components are implemented by using computer programs.

The speech input unit 111, the speech recognizer selection unit 112, the speech recognition unit 113, and the recognition result unification unit 114 in the speech recognition apparatus 110 fulfills functions similar to those of corresponding components in the recognizer weight learning apparatus 100, on the speech data X which is input as the object of the speech recognition processing.

Figure 5:
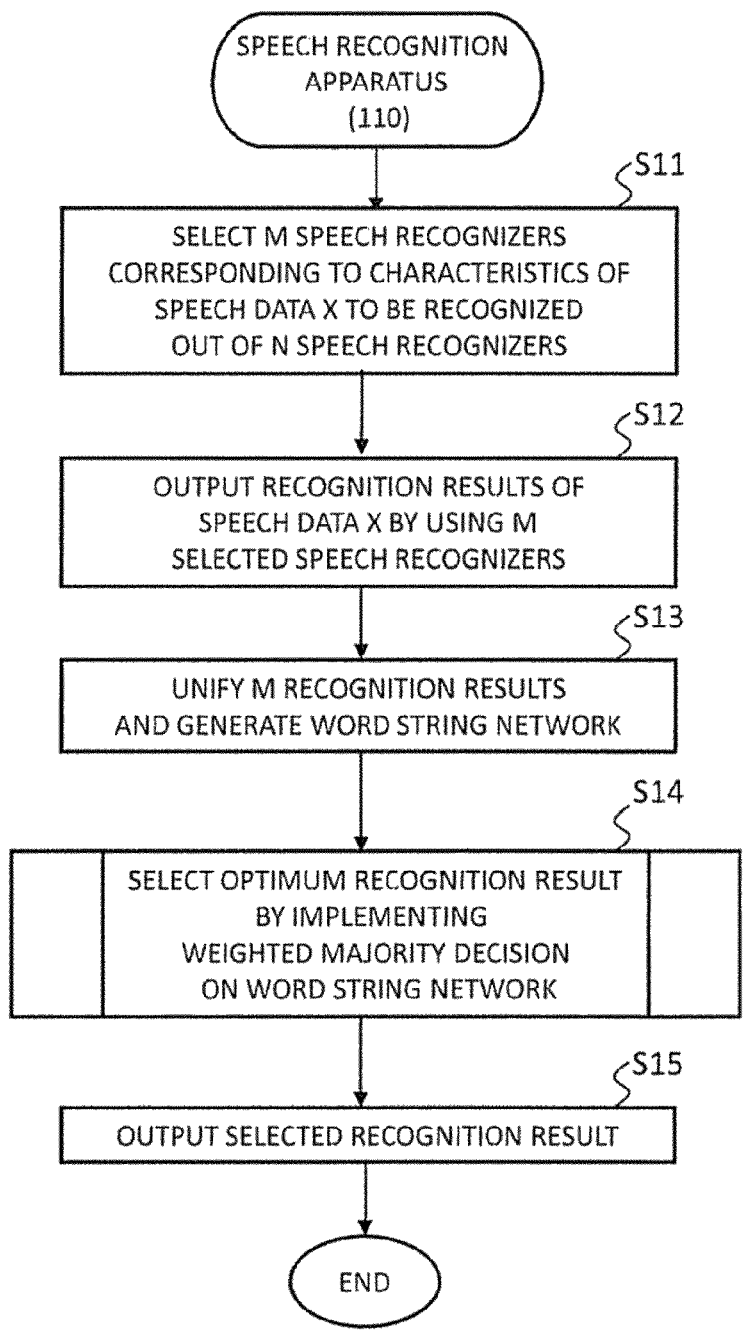
FIG. 5 A flow chart concerns basic operation of a speech recognition apparatus according to an embodiment of the present invention.

Operation of the speech recognition apparatus 110 will now be described with reference to a flow chart, shown in FIG. 5. When speech data X to be recognized is input from the speech input unit 111, the speech recognizer selection unit 112 selects M speech recognizers corresponding to characteristics such as the "speaking rate" of the speech data X from the speech recognizer storage unit 102 (step S11). The speech recognition unit 113 outputs recognition results of those M speech recognizers (step S12). Then the recognition result unification unit. 114 unifies M recognition results and generates a word string network (step S13). The procedure described heretofore is similar to the operation (the steps S1 to S3) of the recognizer weight learning apparatus 100 described with reference to FIG. 2, and detailed description thereof will be omitted.

Subsequently, the recognition result selection unit 115 selects a word string which becomes an optimum recognition result for the speech data X of the recognition object, from the generated word string network (step S14). The recognition result output unit 116 outputs the selected word string as the recognition result of the speech data X (step S15).

Figure 6:
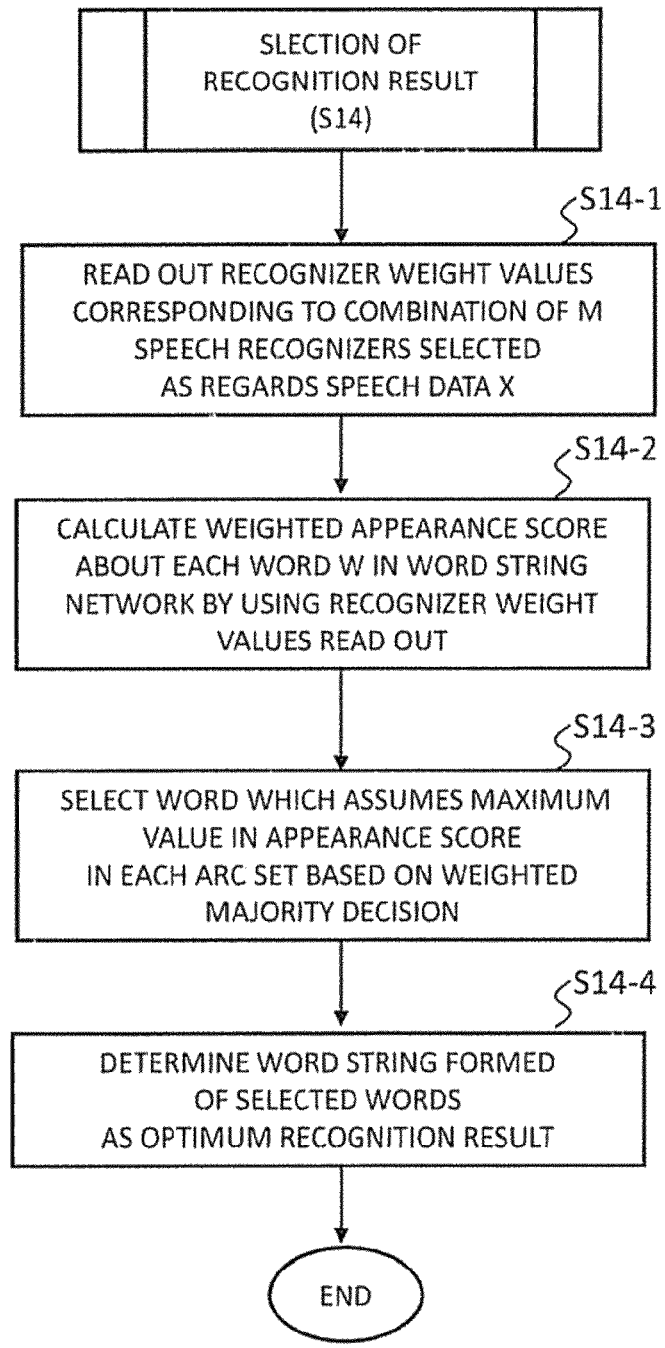
FIG. 6 A flow chart concerns detailed operation of a speech recognition apparatus according to an embodiment of the present invention.
Figure 7:
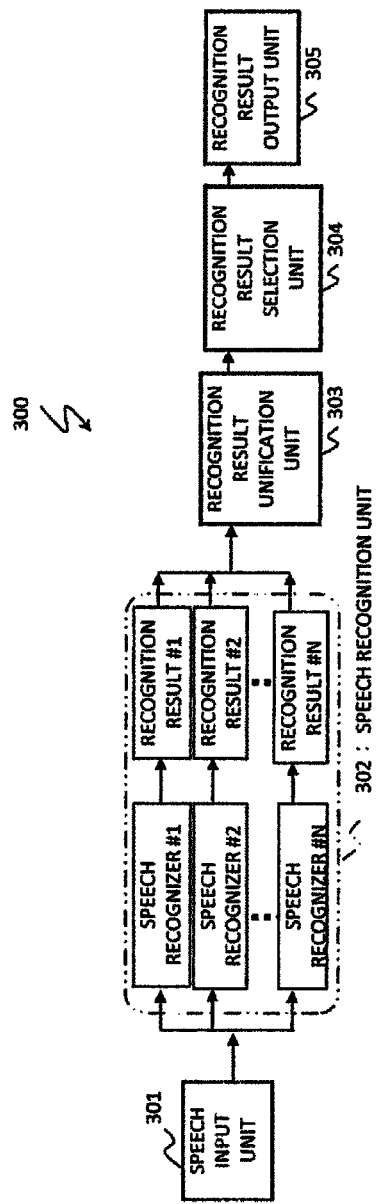
FIG. 7 A block diagram shows a configuration of a speech recognition apparatus described in Non Patent Literature 1.

Processing implemented by the recognition result selection unit 115 will now be described in detail with reference to a flow chart shown in FIG. 6. The recognition result selection unit 115 reads out recognizer weight values corresponding to a combination of M speech recognizers selected as regards the speech data X of the recognition object, from the recognizer weight storage unit 107 (step S14-1).

As regards the processing for reading out recognizer weight values from the recognizer weight storage unit 107, a concrete example will now, be described with reference to the list shown in FIG. 3. It is now supposed that the speech recognizer selection unit 112 has selected "speaking rate: fast," "age: young or middle-aged," and "SNR: large" as speech recognizers suitable for the recognition processing of the speech data X. In this case, the recognition result selection unit 115 reads out recognizer weight values learned as regards a set {"fast," "young or middle-aged," and "large"} of the selected speech recognizers, from the recognizer weight storage unit 107.

The recognizer weight values read out from the recognizer weight storage unit 107 according to the above-described procedure are represented by the following [Math. 10].

$$\Lambda^{\Omega_X}$$ [Math. 10]

The recognition result selection unit 115 calculates the weighted appearance score concerning each word w in the word string network by applying the recognizer weight values read out to [Math. 4] or [Math. 5] described above (step S14-2). In addition, the recognition result selection unit 115 selects a word wi which assumes a maximum value in appearance score every arc set based on a weighted majority decision using the following [Math. 11]. (step S14-3). Then the recognition result selection unit 115 determines a word string formed of words wi selected from respective arc sets as an optimum recognition result of the speech data X (step S14-4).

$$w_i(\Lambda^{\Omega_X}) = \underset{w}{\mathrm{argmax}} S(w, i, \Lambda^{\Omega_X})$$ [Math. 11]

As heretofore described, the speech recognition apparatus 110 acquires recognizer weight values corresponding to a combination of speech recognizers used for the speech data X of the recognition object from the recognizer weight storage unit 107, and derives an optimum recognition result from the word string network by implementing a majority decision which is taken into account the recognizer weight values. The recognizer weight values used at this time are those learned in advance by the recognizer weight learning apparatus 100 beforehand so as to set a weight of a speech recognizer containing more recognition errors to a smaller value and set a weight of a speech recognizer containing more correct answers to a larger value.

According to the system 1000 in the present embodiment, therefore, a proper recognition result can be obtained when implementing speech recognition processing even in a situation in which a plurality of speech recognizers cause a common recognition error or there are a large number of speech recognizers frequently causing recognition errors. Furthermore, since the speech recognition apparatus 110 selects speech recognizers to be used for the recognition processing of the speech data X based on the characteristics of the speech data X, the processing can be implemented efficiently by using more proper speech recognizers.

In the above-described embodiment, three categories (FIG. 3) each having three classes are set as classification of the speech recognizers. In implementing the present invention, however, classification of the speech recognizers is not limited to the illustrated classification. The number of categories, the number of classes and contents of them can be changed suitably according to the use of speech recognition.

As regards the speech recognizes selection unit (103, 112), all categories are made objects of the selection in the embodiment. However, partial categories such as two out of three categories may be made objects of the selection. In this case, categories of the selection object may be changed according to the situation of the learning. In the case where the difference between the presumed value of characteristics such as "speaking rate" and the threshold of presumption is slight, two classes having the threshold as a boundary between them may be selected, i.e., two classes may be selected from one category.

{Industrial Applicability}

The present invention can be applied to various speech recognition techniques for improving the recognition precision by selecting an optimum word string from a word string of a recognition result obtained by a plurality of speech recognizers. Furthermore, the present invention can be implemented as a computer program or a storage medium storing the computer program.

The invention claimed is:

1. A recognizer weight learning apparatus connected to a storage device retaining a plurality of speech recognizers which differ in speech characteristics to be recognized, comprising:

a selection unit selecting speech recognizers corresponding to characteristics of speech for learning from the storage device;

a recognition unit finding recognition results of the speech for learning by using a set of the selected speech recognizers;

an unification unit unifying the recognition results obtained by using the set of the selected speech recognizers and generating a word string network; and a learning unit finding weight values concerning the set of the speech recognizers by implementing learning processing, wherein the learning unit selects a word from each arc set in the word string network based on a majority decision which is taken into account candidates of weight value, and outputs candidates of weight value which minimize a recognition error rate of a word string formed of the selected words, as a learning result.

2. The recognizer weight learning apparatus according to claim 1, wherein, in case where a plurality of speech recognizers classified into a plurality of categories about speech characteristics are retained in the storage device, the selection unit selects speech recognizers of a plurality of categories with respect to speech for learning.

3. The recognizer weight learning apparatus according to claim 1, wherein, when there are a plurality of speeches for learning having a set of speech recognizers selected from the storage device in common, the learning unit finds weight value candidates which minimize a sum of recognition error rates of the plurality of speeches for learning, as a learning result.

4. The recognizer weight learning apparatus according to claim 1, wherein the recognition unit finds a reliability of the recognition result by using speech recognizers selected from the storage device, and when selecting a word from each arc set in the word string network, the learning unit further takes into account the found reliability to the majority decision.

5. A computer readable medium stored therein a program which causes a computer to function as the recognizer weight learning apparatus according to claim 1.

6. A speech recognition apparatus connected to storage devices for storing speech recognizers used by the recognizer weight learning apparatus according to claim 1 and weight values output from the recognizer weight learning apparatus, comprising:

a selection unit selecting speech recognizers corresponding to characteristics of input speech from the storage devices;

a recognition unit finding recognition results of the input speech by using a set of the selected speech recognizers;

an unification unit unifying the recognition results obtained by using the set of the speech recognizers and generating a word string network; and a result selection unit selecting a word string of an optimum recognition result from the word string network and outputting the word string, wherein the result selection unit acquires weight values corresponding to the set of the speech recognizers from the storage devices, selects a word from each arc set in the word string network by implementing a majority decision which is taken into account the acquired weight values, and outputs a word string formed of selected words as the optimum recognition result.

7. The speech recognition apparatus according to claim 6, wherein, in case where a plurality of speech recognizers classified into a plurality of categories about speech characteristics are retained in the storage devices, the selection unit selects speech recognizers of a plurality of categories with respect to input speech.

8. The speech recognition apparatus according to claim 6, wherein the recognition unit finds a reliability of the recognition result by using speech recognizers selected from the storage devices, and when selecting a word from each arc set in the word string network, the result selection unit further takes into account the found reliability to the majority decision.

9. A computer readable medium stored therein a program which causes a computer to function as the speech recognition apparatus according to claim 6.

10. A system comprising:

the recognizer weight learning apparatus according to claim 1;

storage devices for storing speech recognizers used by the recognizer weight learning apparatus and weight values output from the recognizer weight learning apparatus; and a speech recognition apparatus connected to the storage devices, wherein the speech recognition apparatus has: a selection unit selecting speech recognizers corresponding to characteristics of input speech from the storage devices;

a recognition unit finding recognition results of the input speech by using a set of the selected speech recognizers;

an unification unit unifying the recognition results obtained by using the set of the speech recognizers and generating a word string network; and a result selection unit selecting a word string of an optimum recognition result from the word string network and outputting the word string, wherein the result selection unit acquires weight values corresponding to the set of the speech recognizers from the storage devices, selects a word from each arc set in the word string network by implementing a majority decision which is taken into account the acquired weight values, and outputs a word string formed of selected words as the optimum recognition result.

11. A recognizer weight learning method whereby a recognizer weight learning apparatus connected to a storage device retaining a plurality of speech recognizers which differ in speech characteristics to be recognized implements the steps of:

selecting speech recognizers corresponding to characteristics of speech for learning from the storage device;

finding recognition results of the speech for learning by using a set of the selected speech recognizers;

unifying the recognition results obtained by using the set of the selected speech recognizers and generating a word string network; and finding weight values concerning the set of the speech recognizers by implementing learning processing, wherein at the step of finding weight values, the recognizer weight learning apparatus selects a word from each arc set in the word string network based on a majority decision which is taken into account candidates of weight value, and outputs candidates of weight value which minimize a recognition error rate of a word string formed of the selected words, as a learning result.

12. The recognizer weight learning method according to claim 11, wherein, in case where a plurality of speech recognizers classified into a plurality of categories about speech characteristics are retained in the storage device, the recognizer weight learning apparatus selects speech recognizers of a plurality of categories with respect to speech for learning.

13. The recognizer weight learning method according to claim 11, wherein, when there are a plurality of speeches for learning having a set of speech recognizers selected from the storage device in common, the weight learning apparatus finds weight value candidates which minimize a sum of recognition error rates of the plurality of speeches for learning, as a learning result, at the step for finding weight values.

14. The recognizer weight learning method according to claim 11, wherein the recognizer weight learning apparatus finds a reliability of the recognition result by using speech recognizers selected from the storage device at the step of finding recognition results of the speech for learning, and
when selecting a word from each arc set in the word string network at the step of finding weight values, the recognizer weight learning apparatus further takes into account the found reliability to the majority decision.

15. A speech recognition method whereby a speech recognition apparatus connected to storage devices for storing speech recognizers used in the recognizer weight learning method according to claim 11 and weight values output by the recognizer weight learning method implements the steps of:
selecting speech recognizers corresponding to characteristics of input speech from the storage devices;
finding recognition results of the input speech by using a set of the selected speech recognizers;
unifying the recognition results obtained by using the set of the speech recognizers and generating a word string network; and
selecting a word string of an optimum recognition result from the word string network and outputting the word string,
wherein at the step of selecting a word string of an optimum recognition result, the speech recognition apparatus acquires weight values corresponding to the set of the speech recognizers from the storage devices, selects a word from each arc set in the word string network by implementing a majority decision which is taken into account the acquired weight values, and outputs a word string formed of selected words as the optimum recognition result.

16. The speech recognition method according to claim 15, wherein, in case where a plurality of speech recognizers classified into a plurality of categories concerning speech characteristics are retained in the storage devices, the speech recognition apparatus selects speech recognizers of a plurality of categories with respect to input speech.

17. The speech recognition method according to claim 15, wherein the speech recognition apparatus finds a reliability of the recognition result by using speech recognizers selected from the storage devices at the step of finding recognition results of the input speech, and
when selecting a word from each arc set in the word string network at the step of selecting a word string of an optimum recognition result, the speech recognition apparatus further takes into account the found reliability to the majority decision.

* * * * *